May 17, 1955     C. B. VOGEL     2,708,485
WELL LOGGING
Filed April 29, 1952     3 Sheets-Sheet 1
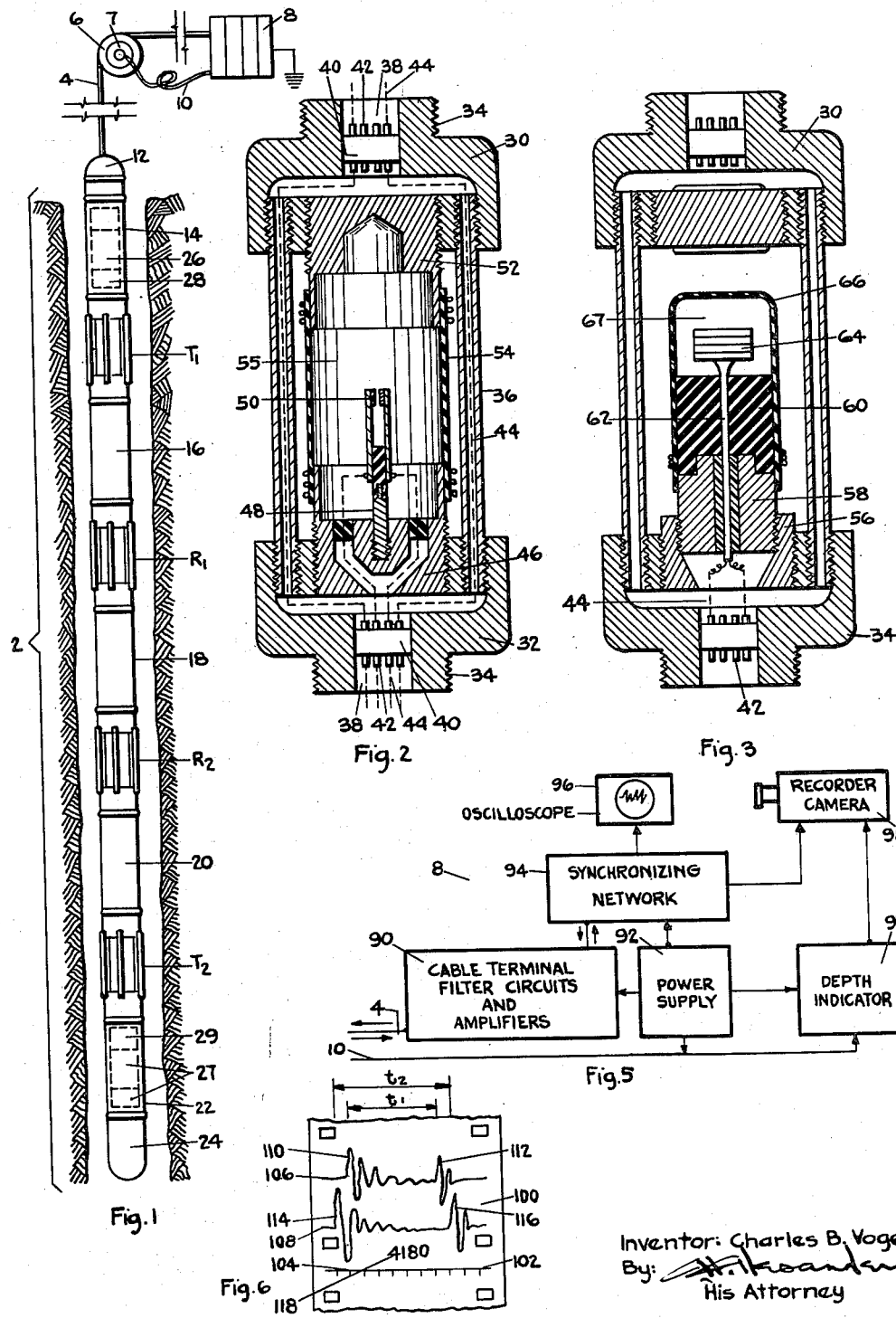
Inventor: Charles B. Vogel
By: [signature]
His Attorney May 17, 1955  C. B. VOGEL  2,708,485
WELL LOGGING
Filed April 29, 1952  3 Sheets-Sheet 2
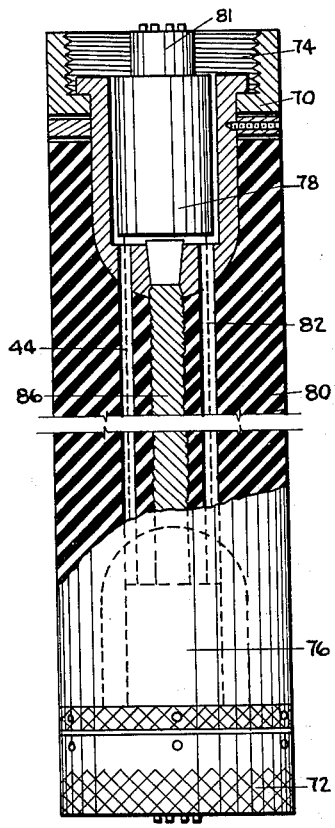
Fig. 4
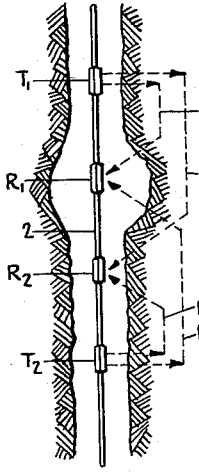
Fig. 7
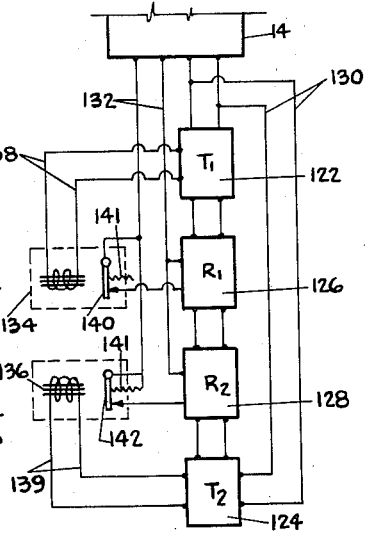
Fig. 8
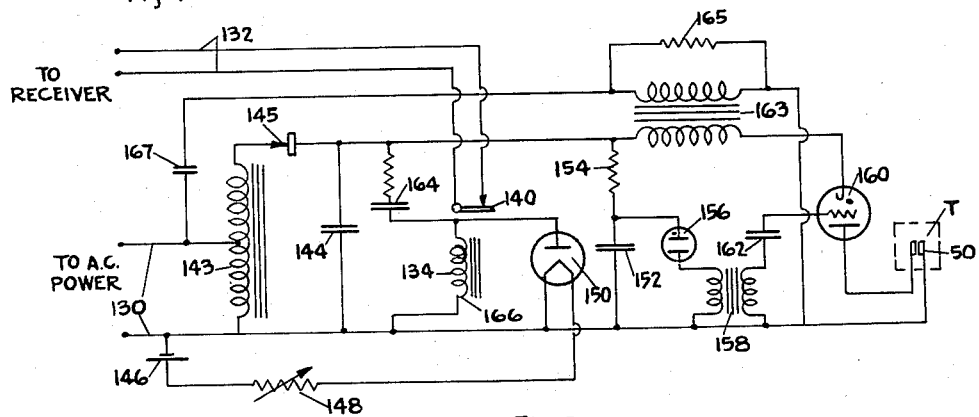
Fig. 9
Inventor: Charles B. Vogel
By: 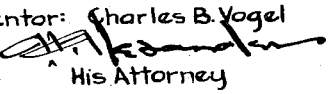
His Attorney May 17, 1955  C. B. VOGEL  2,708,485
WELL LOGGING Filed April 29, 1952  3 Sheets-Sheet 3

Inventor: Charles B. Vogel
By:
His Attorney

United States Patent Office 2,708,485
Patented May 17, 1955

2,708,485
WELL LOGGING

Charles B. Vogel, Houston, Tex., assignor to Shell Development Company, Emeryville, Calif., a corporation of Delaware Application April 29, 1952, Serial No. 284,867

12 Claims. (Cl. 181—0.5)

This invention pertains to the logging of earth formations traversed by a borehole, and relates more particularly to a method and an apparatus for generating acoustic or mechanical impulses within a borehole, and for measuring and recording the velocity of travel of these impulses through the borehole fluids and the surrounding formations with a view to investigating and logging certain characteristics of said formations. This application is a continuation-in-part of my copending application Serial No. 119,128, filed October 1, 1949, now Patent No. 2,651,027, issued September 1, 1953.

The seismic velocity logging method described in said copending application uses a transmitter capable of producing discrete sound pulses within a borehole, and associated receivers and recording equipment for observing the various seismic waves generated thereby. It is thus a transient method of measurement which allows the resolution of various types of sound waves traveling within a borehole. Such resolution is not easily accomplished with continuous waves, especially where it is desired to use a small measuring interval for good resolution of thin layers. With a transient method, on the other hand, it is possible to measure the velocities of transmission of compressional and shear waves in different types of rocks or formations. In some types of rock, the various types of waves give distinctive oscillographic patterns by which the rock type may be identified.

The apparatus of said application Serial No. 119,128 uses as a sound source the small scale explosions caused within a liquid by an electric arc produced by discharging a capacitor through electrodes immersed in the liquid. Such a sound source produces pulses having a rise time of a few microseconds, that is, an extremely steep front. Under conditions of low hydrostatic pressure, it is possible to obtain an instantaneous acoustic output of the order of a megawatt from such source. However, hydrostatic pressure has the effect of changing the sound pulse from a simple non-oscillatory pulse to a rapidly oscillating one whose period and amplitude decrease with increasing pressure. The result is that the effective power of the transmitter decreases in an oil well about 3 decibels per thousand feet depth. The receiver used consists preferably of a piezoelectric hydrophone-type detector provided with electronic amplification means, the receiver being suitably spaced from the transmitter. As the apparatus is moved through the borehole the transmitter produces, at suitable intervals such as 5 feet, a mechanical or acoustic impulse or seismic wave which travels toward the receiver through the well fluid and the surrounding formations, while a signal corresponding to the electrical discharge causing said impulse is relayed to the surface through a well-logging cable. At the receiver, the acoustic impulse is converted to an electrical signal which is relayed to the surface over the same cable and is displayed in a cathode ray oscilloscope which is photographed in such a manner as to give a series of individual frames carrying also other data such as the depth of the instrument, timing calibration signals, etc.

Thus the record obtained consists of a strip of film on which is printed a series of miniature refraction seismograms and associated depths.

The transmitter-receiver spacing is made sufficiently large to insure that the first pulse received is that refracted by the borehole wall, so that the seismic velocity of the formations traversed is indicated on the film directly.

This type of instrumentation may, however, result in considerable error in cases when the borehole diameter variations are large, because of the time required for the refracted pulse to travel through the borehole fluid from the transmitter to the borehole wall and from the borehole wall to the receiver. This error is proportional to the cosine of the critical angle between fluid and wall, and thus increases with increasing wave velocities in the material forming the wall.

It is therefore an object of the present invention to provide an improved logging method and an apparatus of the type outlined above whereby errors in pulse velocity determinations are eliminated or minimized.

It is also an object of this invention to provide for said purpose an improved logging apparatus comprising two separate transmitters and two separate receivers so disposed as to effect this elimination by an averaging process wherein an acoustic impulse is made to traverse a fixed distance between two receivers first in one and then in the other direction.

It is also an object of this invention to provide a logging apparatus comprising at least two alternately firing transmitters and two receivers each responsive to both said transmitters, said apparatus comprising control circuit means for preventing any intermixing of energy from the two receivers resulting in undecipherable records, which is effected by automatically disconnecting either of said receivers from the recording instruments at an instant when an acoustic impulse from a transmitter has reached said receiver but before it has reached the other receiver, or by increasing the amplitude of the signals from one of the receivers as compared with the other receiver, or by other means, as will appear hereinbelow.

These and other objects of this invention will be understood from the following description taken with reference to the attached drawings, wherein:

Fig. 1 is a diagrammatic view of the present apparatus showing the underground and the surface portions thereof;

Fig. 2 is a diagrammatic view in cross-section of a preferred embodiment of the present transmitter;

Fig. 3 is a diagrammatic view in cross-section of the present receiver;

Fig. 4 is a diagrammatic view partly in cross-section of a link member forming part of the present apparatus;

Fig. 5 is a simplified block diagram of the recording or surface portion of the present apparatus;

Fig. 6 shows a photographic frame or seismogram such as obtained by means of the present apparatus;

Fig. 7 is a diagram illustrating the approximate lines of travel of seismic impulses through the formations traversed by a well;

Fig. 8 is a block diagram illustrating control circuit means for selectively disconnecting a receiver in response to a transmitter discharge;

Fig. 9 is a diagram of the circuit means controlling the operation of the transmitters and the receivers of the present invention;

Figure 10:
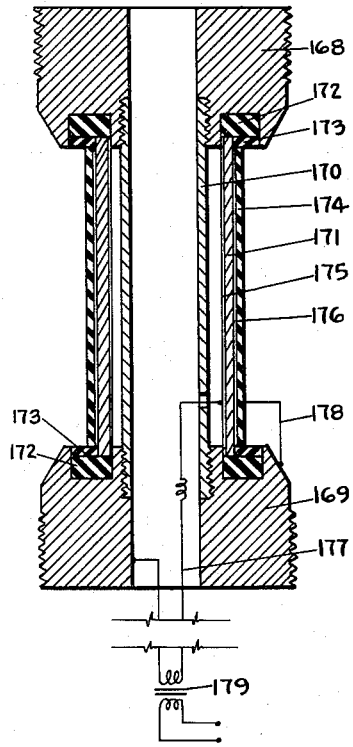
Fig. 10 is a view in cross-section of another form of transmitter element comprising a hollow piezo-electric cylinder.

Referring to Fig. 1, the apparatus of the present invention involves an arrangement generally similar to that of my copending application Serial No. 119,128. This comprises an elongated tubular housing, generally designated by the numeral 2, adapted to be lowered into a borehole at the end of a cable 4, preferably a coaxial or multiconductor insulated cable. The cable 4 passes over a suitably powered and calibrated reel 6, which may be coupled or associated with a Selsyn generator 7. The cable 4 is electrically connected to a surface unit 8, comprising the desired amplifying, synchronizing and indicating or recording elements. The reel 6, or preferably the output of the Selsyn generator 7, is electrically connected to the unit 8 through a conductor 10 in order that the depth or level of the housing 2 may be measured or recorded at any instant together with the desired indications from said housing, as will appear hereinbelow.

The housing 2 consists of a plurality of tubular members, preferably held in fluid-tight screw-threaded engagement with each other. These members may comprise an upper head connector 12, through which mechanical and electrical connection is effected between the housing 2 and the cable 4, an upper instrument case 14, an upper transmitter $T_1$, a link member 16, which is preferably made flexible, an upper receiver $R_1$, a second link member 18, a lower receiver $R_2$, a third link member 20, a lower transmitter $T_2$, a lower instrument case 22, and a bottom closure head 24, which may comprise a lead sinker weight such as 50 lbs.

The basic elements of the present apparatus are the transmitters $T_1$ and $T_2$ and the receivers $R_1$ and $R_2$. The purpose of the instrument cases 14 and 22 is to accommodate, in pressure-tight manner, the auxiliary electric and electronic equipment necessary for the operation of the transmitters and the receivers such as batteries, timing and relay circuits, amplifiers, etc. diagrammatically indicated at 26 and 27. In particular, the capacitor banks necessary to produce a spark discharge at the transmitters, are indicated at 28 and 29 respectively. The purpose of the link members 16, 18 and 20 is to serve as electrical and mechanical connectors between the transmitters and the receivers while also accommodating a part of the auxiliary operating equipment, such as batteries and preamplifiers, as will appear hereinbelow.

The axial length of each of the sections 14 and 22 may vary from 2 to 4 feet, while that of the link members 16, 18 and 20 should be at least 3 feet and may be much longer, such as 30 ft. or more, the normal distance between adjoining receivers and transmitters being preferably about 5 feet. The transmitters and receivers may each have a length of from 1 to 2 feet, so that the whole housing 2 has a length of at least 25 feet, and may be considerably longer.

The transmitters $T_1$ and $T_2$ are identical with each other and are shown in greater detail in Fig. 2. Each transmitter comprises similar upper and lower heads 30 and 32, having external screw threads 34 for attachment to the other units of the housing 2. The two heads are held together at a fixed axial distance from each other by means of a plurality of bars 36, attached to said heads in any desired manner, as by welding, screw-threads, etc. The central bore 38 of either of the heads has installed therein an insulated plug 40, having any desired number of prongs, electrodes or terminals 42 whereby electrical power may be supplied to the transmitter by means of electrical connectors and/or conductors diagrammatically indicated by the dotted lines 44. The bars 36 are made tubular to serve as conduits for the conductors 44, so that proper power distribution may be maintained between the various units 14, $T_1$, $R_1$, $R_2$, $T_2$, 22, etc. of the housing 2. A bushing 46, suitably affixed within the head 32, carries a stem 48 supporting a pair of contacts 50 to which a suitable potential is applied through plugs 40 and conductors 44 to produce a spark discharge therebetween, as will be described hereinbelow.

The bushing 46 and a similar bushing 52 affixed to the head 30 have an elastic or flexible cylindrical diaphragm or partition 54, made of synthetic rubber or any suitable plastic material, connected between them in a fluidtight manner. The chamber 55 which is formed within the partition 54 is preferably filled with a clean fluid, such as silicone grease or oil, in which the contacts 50, which may be carbon contacts, are immersed.

The receiver units $R_1$ and $R_2$, shown in detail in Fig. 3, are in general similar to the transmitters $T_1$ and $T_2$ and will be briefly described here only as to the elements in which they differ therefrom.

The bushing 56 carries a cylindrical member 58, of which at least the upper portion 60 is molded of hard rubber, plastic or similar material. Passing through the solid rubber cylinder 60 and embedded therein is an insulated conductor cable 62 electrically connected to a pressure sensitive element 64, such for example as a stack of piezo-electric tourmaline discs. A flexible boot 66, preferably made of synthetic rubber, is pulled over the cylinder 60 and affixed thereto in fluid-tight manner. The space 67, formed within the tip of the boot 66 is filled with a suitable fluid, such as silicone grease or oil, and serves as a housing for the pressure sensitive element 64.

Fig. 4 shows diagrammatically the structure of the link members 16, 18 and 20. These members comprise metallic upper and lower heads 70 and 72 provided with internal screw-threads 74 for attachment to the other units of the housing 2. Each of the heads has formed therein a chamber 76 adapted to receive a container with necessary auxiliary electric equipment, such as batteries, amplifiers, etc. as indicated at 78. Electrical connections with the rest of the apparatus of housing 2 are established by means of plugs 81.

Fitted or molded between the heads 70 and 72 is a rubber sleeve 80 having therein a plurality of channels 82 for the electrical conductors diagrammatically shown by the dotted lines 44. The two heads are preferably held together by means of a steel cable 86 leaded in or otherwise fixedly attached to said heads. The cable 86 may, however, be dispensed with in apparatus designed for operations at shallow depth, the rubber sleeve 80 having sufficient mechanical strength for such operations.

The purpose of inserting flexible members 16, 18 and 20 into the apparatus 2 is twofold: first, to give the apparatus sufficient flexibility for operation in crooked boreholes, especially when housing 2 has a considerable total length, and, second and most important, to provide a resilient linkage between the transmitters and the receivers in order to prevent the impulses from the transmitters from reaching the receivers through any rigid metallic members connected therebetween instead of reaching them through the formations surrounding the borehole.

Although photo-oscillographic recording is preferably used in the present velocity logging method as the most flexible and informative tool, other recording means may be used without departing from the spirit of this invention. For example, methods well known in the art may be used for converting varying time intervals into varying direct currents, which are used to produce continuous smooth curves. Likewise, conventional circuits adapted to display the amplitudes of the impulses received, or the ratios of said amplitudes, may be readily constructed by those skilled in the art. For simplicity, however, the present invention will be described with regard to the use of photo-oscillographic recording means.

The surface indicating or recording unit 8 of Fig. 1 is basically the same as that described in my copending application Serial No. 119,128. As diagrammatically shown in Fig. 5, this unit comprises a cable terminal network 90 connected to the cable 4 and including all necessary filter circuits and amplifiers; a main power supply 92; a synchronizing network 94 including all necessary synchronizing, calibrating and sweep circuits; a cathode ray oscilloscope 96 energized by the output of network 94; a depth indicator 97 connected through cable 10 to the Selsyn generator 7; and a camera 98 electrically connected to the output of the units 94 and 97 and arranged to photograph the indications of the oscilloscope 96.

In operation, the housing 2 is moved through the borehole at a desired, preferably substantially constant speed, such as from 50 to 150 feet per minute. The depth is determined at any instant from the indications of the Selsyn generator 7, transmitted to the depth indicator 97 and the recorder camera 98. Spark discharges are produced at desired intervals alternately first at one of the transmitters, and then at the other. The spacing between each consecutive set of two discharges may be a function of depth (for example, every 5 feet of travel of the housing 2) or of time (for example, every 2 seconds). Spark discharges are produced by charging the capacitor banks 28 and 29 by current supplied from power supply 92 through cable 4. The capacitors are then discharged through the electrode contacts 50 of the transmitters $T_1$ and $T_2$ by means of the timing and relay circuits 26 and 27, which are in turn actuated by energizing signals delivered thereto at proper time intervals from the surface and determined by a proper setting of the synchronizing unit 94, as will appear hereinbelow and as more fully described in my copending application Serial No. 119,128.

The spark discharge through the liquid in which the electrodes 50 are immersed produces an impulse having a very steep front, which impulse is transmitted through the diaphragm 54 to the borehole fluid on the other side of the diaphragm. The impulse then travels to the borehole wall where it is partially refracted and partially reflected.

Referring to Fig. 1 and assuming that the spark discharge had occurred at transmitter $T_1$, the impulse or seismic wave travels toward the two receivers $R_1$ and $R_2$ both through the formation and the fluid in the borehole, the velocity of travel through the formation being of a considerably higher order than through the borehole fluid. At approximately the level of the receiver $R_1$, a part of the energy of the impulse traveling through the formation is again transmitted through the borehole fluid, the rubber diaphragm 66 and the fluid in chamber 67 to the piezoelectric element 64 of receiver $R_1$, being converted thereby to an electric pulse which is conveyed after amplification to the surface through the cable 4. The rest of the energy of the impulse continues to travel toward the receiver $R_2$ which it reaches in a manner and along a path similar to that described with regard to the receiver $R_1$. A second electric pulse is accordingly produced by receiver $R_2$ and is similarly conveyed to the surface through the cable 4.

Another spark discharge is then produced at the transmitter $T_2$ in a manner identical to that already described, and two further electric pulses are in consequence delivered to the surface by the receivers $R_2$ and $R_1$ in the order named.

The pulses or signals produced by the receivers $R_1$ and $R_2$ are first amplified by the amplifier or pre-amplifier stages carried by the housing 2 in compartments 26 and 27 of Fig. 1 and 76 of Fig. 4. This permits the pulses to be transmitted through the cable 4 to the surface apparatus without excessive attenuation. The signals are then delivered to the cable termination and filter circuits of unit 90, which unit effects the separation of the energizing power from unit 92, the actuating impulses from the synchronizing network 94, and the incoming signals from the receivers. Each signal is then further amplified by amplifiers which may either form independent units, or be incorporated in unit 90, as shown for simplicity in Fig. 5.

The amplified signals are then directed through the synchronizing network 94 to the oscilloscope 96 and the camera 98, setting these units in operation after a short delay, for example, 0.5 second, during which the cycle of recording, depth indication, sweep calibration, film feed, etc. may take place. For example, pulses from sweep circuits forming part of the synchronizing network 94, upon actuation by the signal received, may be used to turn on the beam of the cathode ray oscilloscope, thus eliminating the recording of stray light on the camera film in the intervals between successive recordings. The synchronizing unit 94 also supplies to the camera 98 the necessary energizing pulses to control the film feed. The depth indicator 97, energized by the Selsyn generator 7, applies a proper depth mark to each signal from the receivers recorded on the film of the camera 98. All these operations are of conventional nature and will not be described here in detail as not forming part of the present invention.

Upon the arrival of the signal to the oscilloscope 96, the transient oscillations which appear on the cathode ray screen are photographed by the recorder camera 98 to give a record such as illustrated in Fig. 6.

Fig. 6 shows a strip of film 100 carrying a timing line or scale 102 thereon, each of the divisions 104 marked on said scale being of an order such as $10^{-4}$ second. 106 is the record line formed by the sound pulse from the transmitter $T_1$. The transient oscillation corresponding to the arrival of the sound impulse to receiver $R_1$ is indicated at 110, and that due to the arrival of the same impulse to receiver $R_2$ is indicated at 112. 108 is the record line formed due to the discharge of a spark by the other transmitter $T_2$, which discharges approximately .05 second after $T_1$. The transient oscillation corresponding to the arrival of the second sound impulse to receiver $R_2$ is indicated at 114, and that due to the arrival of said second impulse to receiver $R_1$ is indicated at 116. A mark 118, giving the exact depth in feet of the center point of the housing 2 is printed on the film directly by the depth indicator 97. The complete velocity logging record of a well or of a portion thereof consists of a plurality of seismograms similar to that of Fig. 6 preferably recorded on a single film of any desired length.

The particular improvement effected by the present system as compared to that described in my copending application Serial No. 119,128 consists in providing means for averaging two readings in such a manner as to eliminate or minimize errors due to the effect of the borehole fluid, thereby giving a much higher accuracy of measurement of seismic velocities.

It will be borne in mind in this connection that the velocity of travel of seismic impulses through the well fluid is of an order much lower, such as 5000 feet/sec. than that of travel through the surrounding formations, which may be as high as 25,000 feet/sec. Due to factors such as the local enlargements of the borehole diameter at certain depths, the unequal or varying spacing or centering of the transmitters or receivers with regard to the walls of the borehole, etc., the time required for an impulse to traverse the distance from the transmitter to the receiver will vary in accordance with the ratio of the relative lengths of paths traveled by the impulse through the borehole fluid and through the formation. This is diagrammatically illustrated in Fig. 7, showing a physical configuration of borehole and logging apparatus conditions resulting in a seismogram such as shown in Fig. 6.

The paths of the various impulses resulting in oscillations 110, 112, 114 and 116 of Fig. 6 are shown in dotted lines and are denoted by the same numerals in Fig. 7. Since the receiver $R_1$ happens to be positioned in an enlarged portion of the borehole, the path 110 from $T_1$ to $R_1$ comprises a relatively long portion extending through the well fluid, and the arrival of impulse 110 to receiver $R_1$ is accordingly somewhat delayed, as may be seen from comparing the records on lines 106 and 108 of Fig. 6. The receiver $R_2$, on the other hand, being located in a normal portion of the borehole, the path of the impulse 112, and the time of its arrival to receiver $R_2$ are normal.

Now, when another sound pulse is produced by the transmitter $T_2$, the impulse 114 has a normal path and time of arrival to receiver $R_2$, whereas the impulse 116 has to pass through an increased length of fluid path on its way to the receiver $R_1$. The result is that the time of travel of impulse 114 is shorter than that of impulse 110, while the time of travel of impulse 116 is longer than that of impulse 112. Consequently $t_1$, the apparent time of travel of an impulse between $R_1$ and $R_2$ is shorter than $t_2$, the apparent time of travel of an impulse between $R_2$ and $R_1$. Since this is obviously impossible, the true impulse travel time can be found by averaging $$t_1 \text{ and } t_2 \left( t_0 = \frac{t_1 + t_2}{2} \right)$$

and the true seismic velocity may be accurately determined by dividing the spacing between receivers $R_1$ and $R_2$ by the value thus found.

Since the transient oscillations 110 and 114 of Fig. 6 may sometimes have time constants resulting in delay periods well in excess of the values of $t_1$ or $t_2$, it is essential to dampen said oscillations to an amplitude negligible as compared with that of impulses 112 and 116, or otherwise to reduce said amplitude substantially to zero before the impulses 112 and 116 appear on the oscilloscope screen, since the intermixing of the energy of these oscillations would result in unintelligible seismograms. Several methods are therefore provided according to the present invention to differentiate between the responses of the two receivers.

It has been found that a convenient way of achieving the desired result consists in alternately disconnecting the receivers $R_1$ and $R_2$ from the cable 4 and thus from the recording units at the surface. This will be understood by reference to Fig. 8, wherein the transmitters and receivers $T_1$, $T_2$, $R_1$ and $R_2$ and the operating circuits associated therewith are designated by numerals 122, 124, 126 and 128, respectively. The transmitters $T_1$ and $T_2$ are connected to energizing power conductors 130, while the receivers $R_1$ and $R_2$ are connected to signal conductors 132. It is, however, understood that the transmitters and receivers may be connected to the surface through the same pair of conductors by using proper filters in the unit 90. The conductors 130 and 132 are in turn connected, through the instrument case 14, to the cable 4 and thus to units 90 and 92 or 90 and 94, respectively.

The connection between the cable and the receivers $R_1$ and $R_2$ is effected by means of switching relays 134 and 136, energized through leads 138 and 139 from transmitters $T_1$ and $T_2$ respectively.

The operation of the circuits of Fig. 8 is as follows: when a spark discharge occurs at transmitter $T_1$, a portion of the current surge is used to energize the relay 134 with a time delay chosen so that switch 140 opens after the seismic impulse due to the spark discharge has reached receiver $R_1$, but before it has reached receiver $R_2$, thereby disconnecting receiver $R_1$ before the oscillation 112 appears on the oscilloscope screen and thus preventing the mixing up of energies of impulses 110 and 112. When the transmitter $T_2$ fires, a similar sequence of operations takes place to disconnect receiver $R_2$. The relay switches are self-resetting as diagrammatically indicated by means of springs 141.

Figure 12:
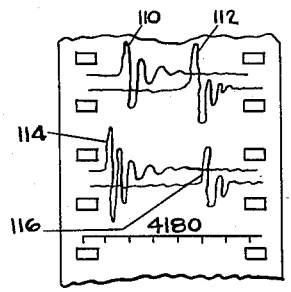
Fig. 12 shows another type of photographic frame or seismogram obtained by means of the present system.

The above-described method of switching one receiver off before an impulse has reached the other receiver is used according to the present invention because of the poor quality of commercially available well logging cable, wherein so much cross-coupling occurs between any two pairs of conductors that the signals become mixed and unintelligible. Given a properly engineered multi-conductor cable, it is possible to bring to the surface signals from the separate receivers by means of separate conductor pairs. The signals may then be applied to separate deflection plates of a double-beam cathode-ray tube to produce records similar to that shown in Fig. 12, which is believed to be self-explanatory, the same numerals being used to denote the same events as in Fig. 6.

Figure 13:
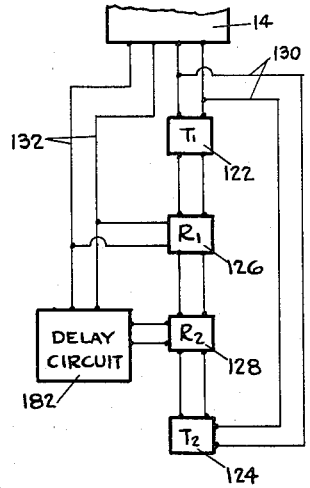
Figs. 13 and 14 are block diagrams of alternative control circuit means for differentiating between the responses of the two receivers.

It is also possible to separate signals from the two receivers by incorporating into the present system a time delay network 182, as shown in Fig. 13, said network being connected between one of the receivers, e. g. $R_2$, and the cable conductors 132. The network 182 is designed to delay the signal from the receiver $R_2$ by a sufficiently long interval to eliminate interference between the two electrical signals from receivers $R_1$ and $R_2$. Thus, although these two signals are produced very soon one after another by the impinging acoustic pulses, they are sent up the cable at time intervals sufficiently spaced to prevent interference. Such delay intervals should be approximately 7 milliseconds for the case of three equal five foot intervals between the transmitting and receiving elements, 7 milliseconds being approximately the time required after the production of a sound pulse for the pulse at the farthest detector to decay to a negligible amplitude.

Figures 14, 16:
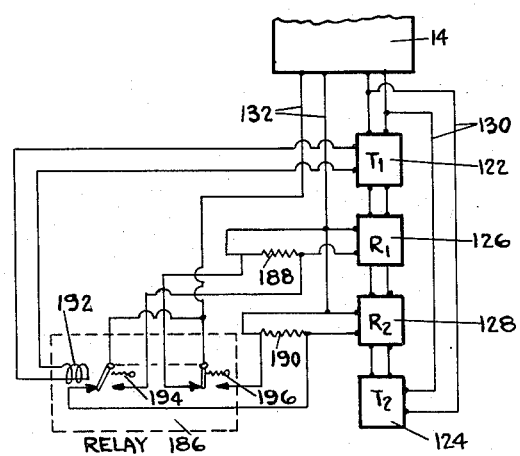
Fig. 16 is a diagram showing an alternative arrangement of a logging system according to the present invention involving the use of more than two receivers.
Figure 15:
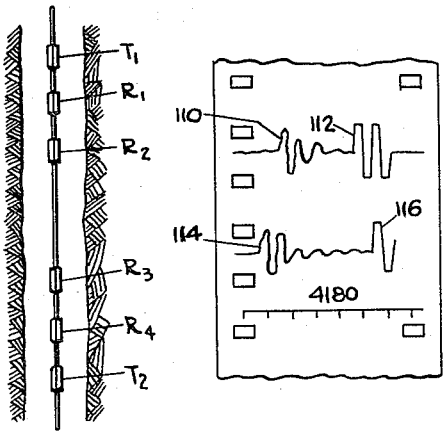
Fig. 15 shows a photographic frame or seismogram obtained by means of the system of Fig. 14.

It is further possible to separate signals on the basis of their amplitude. In such case, the preamplifier circuits are preferably so arranged and controlled that the receiver farthest from the transmitter operating at any particular moment produces a signal of much larger amplitude than the other receiver. Thus referring to Figs. 1 or 7, as transmitters $T_1$ and $T_2$ fire in succession, a signal of a larger amplitude is produced and sent up the cable by receivers $R_2$ and $R_1$, respectively. A circuit suitable for carrying out this method is diagrammatically shown in Fig. 14, wherein the same numerals are used to indicate the same elements as in Fig. 8. The circuit of Fig. 14 comprises essentially a double pole, double throw relay 186 whereby the resistances 188 and 190 of receivers $R_1$ and $R_2$ are alternately connected and disconnected with the cable conductors 132. The energizing coil 192 of the relay is connected across the main or discharge capacitor of transmitter $T_1$. For the arrangement of Fig. 14, the timing circuits of the synchronizing network 94 are assumed to be arranged so that $T_1$ fires before $T_2$. The relay 186 is shown in its position just before $T_1$ fires, while its main capacitor or capacitor bank is still charged. After this capacitor has discharged, coil 192 becomes de-energized, and the position of the contacts is reversed by the springs 194 and 196, preferably after a short delay of the order of .002 second. The type of record obtained with the arrangement of Fig. 14 is shown in Fig. 15, events identical to those of Fig. 6 being indicated by the same numerals.

Although many circuits can be used to perform the desired operations in accordance with the present invention, as will be readily understood by those skilled in the art, a circuit involving an arrangement of electronic equipment especially suitable for the desired purpose is diagrammatically shown in Fig. 9, wherein elements shown in other drawings are indicated by the same numerals.

The operation of the circuit of Fig. 9 may be briefly described as follows.

Operating power, for example, a 60 volts, 60 cycles alternating current is supplied from the surface units 92 and 90 through cable 4 and instrument case 14 (not shown in Fig. 9), and is applied through power conductors 130 to a transformer 143 to step up the voltage to a value of the order of 1000 volts. It is then rectified by rectifier 145 to direct current for charging the main discharge capacitor or capacitor bank 144, having a relatively large capacity such as 8 microfarads. When the A. C. current supply is discontinued, for example, in response to an actuating impulse from the synchronizing network 94 of Fig. 5, the capacitor 152, having a value of the order of 0.5 microfarad, continues being charged through the resistance 154 until it is raised to a potential sufficiently high, such for example as 50 or 60 volts to permit to neon tube 156 to ignite. Upon the neon tube 156 becoming conductive, the current pulse passing through the primary of transformer 158 induces in the secondary of said transformer a voltage surge which is sufficiently high to fire the thyratron 160 when applied to the grid thereof through capacitor 162, having for example a value of the order of 0.01 microfarad. When the thyratron is ignited, the main capacitor 144 discharges therethrough and through the contacts 50 of the transmitter, thereby creating the desired spark discharge. The discharge current passing through the primary of transformer 163, produces in the secondary thereof a highly damped pulse, said secondary being shunted with a resistance 165 having a value such as 10 ohms. This damped pulse is transmitted to the surface through a coupling condenser 167 to indicate the initiation of each sound pulse by a spark discharge.

When the thyratron becomes conductive, the condenser 164 discharges through the coil 166 of the relay switch 134, thus causing said switch to open and to disconnect the receiver connected thereto through the signal conductors 132 for the purpose already described hereinabove. A delay control circuit comprising a diode 150, located in the well instrument 2, a current source or battery 146 and a variable resistance 148, located either in the well instrument, or preferably at the surface, serves as a variable resistance shunt to vary in a desired manner the relay sensitivity and time constant, thus varying the speed with which coil 166 opens switch 140. This control is necessary to insure that switch 140 does not open so fast as to eliminate from the record the response of the near receiver, nor so slowly as to allow the response of the near receiver to be intermixed with the response of the far receiver for any given sound pulse produced by a transmitter. For any given setting of the delay control, the range of the velocities that can be satisfactorily measured is determined by the ratio of the sum of spacing between the receivers plus the spacing between a transmitter and a receiver to the spacing between a transmitter and a receiver. Where these spacings are equal (for example, as they are when they are all made equal to 5 feet for normal conditions), the range of velocities measurable for a given setting is 2 to 1. Thus, where seismic velocities vary over a greater range, provision must be made for varying the response of the switching delay from the surface.

With the described system involving the use of two transmitters and two detectors, the accuracy obtainable becomes dependent chiefly upon the precision with which the arrival of the seismic impulse or wave to the receiver can be resolved. The errors are essentially reading errors. The probable reading error of the inception of a pressure wave, such as the one under consideration when using tourmaline or piezo-electric detectors at the receivers, is given approximately by the expression:

$$E < \frac{0.1}{V}$$

wherein E is the absolute error in seconds and V is the velocity of the wave travel through the formation in feet per second. This requires reading a quasi-sinusoidal wave to one tenth of a period. This relationship is due to the fact that the frequency of the compressional wave is roughly proportional to its velocity. The probable error for the average of two time differences, when the receivers are 5 feet apart, is thus approximately 2 per cent, or 10 microseconds when $V = 10,000$ ft./sec. When the travel times are integrated over a 500 foot interval, the probable error is less than 0.2 per cent, whereas the highest possible precision obtainable with conventional seismic well velocity surveys, or with a system such as described in my copending application Serial No. 119,128, over such an interval, involves an error of 1 per cent, and even, for high velocities, an error as large as 5 per cent. When the present logging measurements are integrated over 10,000 ft., the probable error becomes less than 0.05 per cent. Thus it can be said that the precision of the integrated logging measurements over long intervals is such that the chance of the logging value being in error more than 0.25 per cent is less than 1 in 1,000. The chance of seismic and integrated logging values differing by more than 5 milliseconds is likewise about 1 in 1,000 (assuming no instrumental or systematic errors occur in either measurements). It should be noted that the chance for the latter kind of errors in conventional seismic velocity surveys is by no means negligible.

The velocity logging apparatus described hereinabove is primarily useful for obtaining accurate velocity surveys for use in interpreting seismic records. Besides yielding precise time-depth data, the present method can be successfully used for accurately locating the depth of reflecting horizons, and for correlating and identifying various rock types. Thus, for example, limestones are distinguishable from shales by the absence of shear waves in shale formations.

Further, the present method and apparatus are applicable for the study of the relation between porosity and velocity. It can be shown that where porosity variations occur without other changes in lithology, significant velocity variations will occur which can readily be measured with the present method and apparatus. For example, when the seismic velocity is 7,000 feet/sec., the decrease in velocity accompanying a 1 per cent increase in porosity can be as much as 0.5 per cent; when the velocity is 10,000 feet/sec., the corresponding decrease can be as great as 1 per cent.

It is understood that the above description is not to be taken as limiting the present invention in any way except as defined by the claims appended hereto, and that various modifications of the embodiments described hereinabove may be readily effected by those skilled in the art without departing from the spirit of said invention.

In particular, the spark type transmitter shown in Fig. 2 may be replaced by another suitable generator of steep front impulses. Fig. 10 shows such a transmitter, comprising steel end-pieces 168 and 169 connectable between the heads 30 and 32 of Fig. 2. These end-pieces are held together by a reinforcing tubular steel member 170. Coaxially surrounding the tube 170 is a hollow cylindrical element 171 made of a piezo-electric material such as barium titanate, which is bonded to the end pieces by means of suitable gasket or packing elements 172 and 173, made of materials such as thermosetting resins and soft rubber. Also bonded to the element 173 is a protective rubber sleeve or diaphragm 174 surrounding the cylinder 171. The inner and outer cylindrical surfaces of 171 are metal plated to form two electrodes 175 and 176, which are connected, through leads 177 and 178 and ground 169, to the high-voltage secondary of a transformer 179 whose primary is in turn connected to the condenser discharge circuit, both the transformer and the condenser discharge circuit forming part of the transmitter auxiliary equipment. When the condenser is discharged through the transformer primary, the high voltage produced in the secondary and applied between the electrodes 175 and 176 causes a momentary change of the diameter of the cylinder, thereby producing a cylindrical symmetrically outgoing pulse. Although at low hydrostatic pressures the transmitter of Fig. 10 is somewhat less efficient than the spark transmitter, it is usually more reliable and has a longer life, being moreover able to serve also as a receiver.

Figure 11:
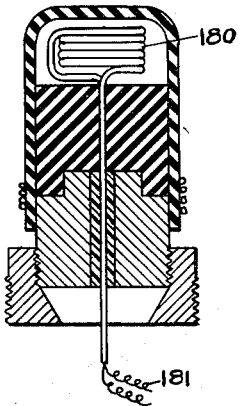
Fig. 11 is a view in cross-section of a further form of transmitter element comprising a loosely wound coil immersed in a liquid.

A still further type of transmitter which may be advantageously used with the present invention is shown in Fig. 11. The essential element of this transmitter is structurally similar to the receiver element shown in Fig. 3 and described with regard thereto. The tourmaline pressure sensitive element 64 of Fig. 3 is, however, replaced by a loosely wound multi-layered helix 180 of insulated wire. This helix is immersed in a liquid which is preferably viscous and of high magnetic permeability, and is connected by leads 181 to a transformer and discharge capacitor arrangement similar to that described with regard to Fig. 10. When the condenser is discharged through the helical winding 180, the helix momentarily contracts, and the radial thickness of its multi-layered winding decreases. This results in a net volume decrease of the lattice-like structure of the helix, and a corresponding decrease in volume of the viscous liquid entrapped between the turns of wire, the viscosity of the liquid preventing its ready escape therefrom. This results in a rarefaction or negative pressure pulse which is propagated in all direction as an acoustic wave. This transmitter has the important feature of producing appreciable low-frequency energy in the form of non-directional, substantially spherical pressure pulses even when subjected to high hydrostatic pressures.

It is further understood that although the above described arrangement involving two transmitters and two receivers forms a preferred embodiment of the present invention it is sometimes possible to obtain good results by using a somewhat simplified system comprising two receivers vertically spaced above a single transmitter, or alternatively two transmitters vertically spaced above a single receiver. An accurate survey can be effected in such cases by making two consecutive runs or traverses of the borehole with the instrument inverted for the second traverse. The two logs obtained by these two traverses of the hole, when averaged, yield measurements closely similar to those obtained with the double-transmitter, double-receiver system described above. This method, of course, has the drawback of requiring two runs and also introduces an additional source of error because the accuracy with which the instrument is centered in the well affects the overall accuracy of the measurements.

It is further possible to eliminate the necessity of running two traverses by using an arrangement comprising four receivers vertically spaced between a top and a bottom transmitter, a relatively large spacing, such as 30 feet, being used between the two middle receivers $R_2$ and $R_3$, as diagrammatically shown in Fig. 16. This arrangement has the advantage that more sound pulses per unit time can be used, since it is unnecessary to wait, after firing the first transmitter, for the sound transients to decay to a suitably small value, which takes a time of about 0.005 second, before firing the second transmitter, since the two instruments are sufficiently separated to eliminate interference between the two sound pulses. The higher repetition rate made possible allows greater detail, that is, more measurements per foot of hole depth, than is possible with the double-receiver, double-transmitter instrument, although the improvement is small. Centralizers should preferably be used to eliminate the centering errors mentioned hereinabove when using this variation of the present system.

I claim as my invention:

1. In a method of seismic velocity measurement, the steps of establishing within a borehole two receiving stations spaced from each other along a substantially vertical line, producing an acoustic impulse at a point located along said vertical line to one side of said two receiving stations, recording the consecutive times of arrival of said impulse at said two stations, producing a second acoustic impulse at a point located along said vertical line to the other side of said two receiving stations, recording the consecutive times of arrival of said second impulse at said two stations, and comparing the records obtained.

2. Apparatus for seismic velocity measurements, comprising two receivers spaced from each other along a substantially vertical line, two transmitters positioned along said vertical line one above and the other below said two receivers, means for alternately energizing each of said two transmitters to produce acoustic impulses traveling past said two receivers alternately in opposite directions, means at each receiver for detecting the arrival thereto of each of said impulses, and means electrically connected to said transmitters and said receivers for recording the detected impulses.

3. In a system for seismic velocity measurements, a circuit comprising two receivers spaced from each other along a substantially vertical line and two transmitters positioned along said vertical line one above and the other below said two receivers, means in said circuit for alternately energizing each of said two transmitters to produce acoustic impulses traveling past both receivers alternately in opposite directions, means at each receiver for translating said impulses into electrical signals, oscilloscope means connected to the output of said receivers for displaying said signals, and photographic means electrically connected to said oscilloscope means and synchronized therewith for recording said signals.

4. In a system for seismic measurements, surface apparatus comprising a source of power and a recording unit, subsurface apparatus adapted to be lowered into a borehole, a conductor cable supporting said subsurface apparatus, said subsurface apparatus comprising two transmitters and two receivers spaced from each along a vertical line, one of the transmitters being mounted above and the other below the two receivers, electric circuit means comprising said conductor cable connecting said transmitters and said receivers to the surface apparatus, said transmitters being connected by said circuit to said source of power and said receivers being connected by said circuit to said recording unit, means in said circuit for alternately energizing said two transmitters to produce acoustic impulses traveling past the two receivers alternately in opposite directions, means at each receiver for translating said impulses into electrical signals, oscilloscope means in said recording unit for displaying said signals, and photographic means synchronized with said oscilloscope means for recording said signals.

5. The system of claim 2, wherein each transmitter comprises a fluid filled chamber having a diaphragm wall separating the fluid therein from the well fluid, two electrodes in contact with the fluid within said chamber, a transformer having its secondary connected to said electrodes, and a capacitor adapted to discharge across the primary of said transformer.

6. The system of claim 2, wherein each transmitter comprises a fluid filled chamber having a diaphragm wall separating the fluid therein from the well fluid, and two electrodes immersed in the fluid within said chamber, said transmitter being energized by the application to said electrodes of a potential sufficiently high to cause the discharge of a spark through the fluid between said electrodes.

7. The system of claim 2, wherein each receiver comprises a fluid filled chamber having a diaphragm wall separating the fluid therein from the well fluid, and a pressure responsive piezo-electric crystal element immersed in said chamber fluid.

8. The system of claim 2, wherein each receiver comprises a fluid filled chamber having a diaphragm wall separating the fluid therein from the well fluid, and a pressure responsive tourmaline crystal element immersed in said chamber fluid.

9. Apparatus for seismic velocity measurements, comprising two groups of two receivers each all spaced from each other along a substantially vertical line, the distance between two adjacent receivers of two different groups being substantially greater than the distance between two receivers of the same group, two transmitters positioned along said vertical line each to one side of said two groups of receivers, means for alternately energizing each of said two transmitters to produce acoustic impulses, means at each receiver for detecting the arrival thereto of each of said impulses, and means connected in circuit with said transmitters and said receivers for recording the detected impulses.

10. Apparatus adapted to be used in a well for seismic velocity measurements, comprising two receivers spaced from each other along a substantially vertical line, two transmitters positioned along said vertical line one above and the other below said two transmitters, electric circuit means connected to the input of said transmitters for alternately energizing each of said two transmitters to produce acoustic impulses traveling past said two receivers in opposite directions, means at each receiver for detecting the arrival thereto of each of said impulses, a recorder energized by said electric circuit means, said recorder having its input connected to the outputs of said two receivers for recording the detected impulses, and a delay circuit interposed between the output of one of said receivers and the input of said recorder for delaying the response of said receiver by a time period sufficient to prevent a substantial mixing of the energy of said response with that of the response of the other receiver to the same impulse.

11. Apparatus adapted to be used in a well for seismic velocity measurements, comprising two receivers spaced from each other along a substantially vertical line, two transmitters positioned along said vertical line one above and the other below said two transmitters, electric circuit means connected to the input of said transmitters for alternately energizing each of said two transmitters to produce acoustic impulses traveling past said two receivers in opposite directions, means at each receiver for detecting the arrival thereto of each of said impulses, a recorder energized by said electric circuit means, said recorder having its input connected to the outputs of said two receivers for recording the detected impulses, an attenuation circuit comprising resistance means in the output circuit of each of said receivers, and relay means actuated by the energization of one of said transmitters for alternately connecting said resistance means to the input of said recorder.

12. The system of claim 2, wherein each transmitter comprises a fluid filled chamber having a cylindrical diaphragm separating it from the fluid in the well, a hollow cylindrical piezo-electric element made of barium titanate having its outer cylindrical face adjacent the inner side of said diaphragm, said barium titanate element having metal plated inner and outer cylindrical faces forming two electrodes, one of said electrodes being in contact with the fluid within said chamber and the other with the fluid in the well through said diaphragm, a transformer having its secondary connected to said electrodes, and a capacitor adapted to discharge across the primary of said transformer.

References Cited in the file of this patent

UNITED STATES PATENTS

| | | |
|---|---|---|
| 2,137,985 | Salvatori | Nov. 22, 1938 |
| 2,233,992 | Wyckoff | Mar. 4, 1941 |
| 2,301,458 | Salvatori | Nov. 10, 1942 |